US011308322B2

(12) United States Patent
Rogan

(10) Patent No.: US 11,308,322 B2
(45) Date of Patent: Apr. 19, 2022

(54) LOCATING A CLIENT DEVICE USING GROUND TRUTH IMAGE RENDERING

(71) Applicant: Uber Technologies, Inc., San Francisco, CA (US)

(72) Inventor: Aaron Matthew Rogan, Westminster, CO (US)

(73) Assignee: Uber Technologies, Inc., San Francisco, CA (US)

( * ) Notice: Subject to any disclaimer, the term of this patent is extended or adjusted under 35 U.S.C. 154(b) by 104 days.

(21) Appl. No.: 16/712,829

(22) Filed: Dec. 12, 2019

(65) Prior Publication Data

US 2020/0234042 A1    Jul. 23, 2020

Related U.S. Application Data

(60) Provisional application No. 62/812,101, filed on Feb. 28, 2019, provisional application No. 62/812,107, (Continued)

(51) Int. Cl.
*G06K 9/00* (2006.01)
*G06F 3/01* (2006.01)
(Continued)

(52) U.S. Cl.
CPC ....... *G06K 9/00624* (2013.01); *G01C 21/343* (2013.01); *G01C 21/3438* (2013.01);
(Continued)

(58) Field of Classification Search
CPC .. G06K 9/00624; G06K 9/6201; G06F 3/016; H04B 1/3827
(Continued)

(56) References Cited

U.S. PATENT DOCUMENTS 8,483,715 B2    7/2013   Chen
8,806,653 B2    8/2014   Di Rienzo
(Continued)

FOREIGN PATENT DOCUMENTS

DE   102006034413 A1    1/2008
EP      2241858 A2    10/2010

OTHER PUBLICATIONS

European Patent Office, Extended European Search Report and Opinion, EP Patent Application No. 18854606.3, dated Apr. 23, 2021, ten pages.

(Continued)

*Primary Examiner* — Ayodeji O Ayotunde
(74) *Attorney, Agent, or Firm* — Fenwick & West LLP

(57) ABSTRACT

Systems and methods are disclosed herein for determining a location of a device, for example, by receiving, from a client device, a rendering of an image captured by the client device. The systems and methods compare the received rendering to entries in a database of renderings, each respective entry including a respective rendering and a respective associated location, and determine, from the comparing whether the received rendering matches a respective rendering included in a respective entry in the database of renderings. The systems and methods, in response to determining that the received rendering matches the respective rendering included in the respective entry, determine the location associated with the matching rendering, and transmit the location to the client device.

20 Claims, 5 Drawing Sheets

Related U.S. Application Data filed on Feb. 28, 2019, provisional application No. 62/812,098, filed on Feb. 28, 2019, provisional application No. 62/802,145, filed on Feb. 6, 2019, provisional application No. 62/801,012, filed on Feb. 4, 2019, provisional application No. 62/801,010, filed on Feb. 4, 2019, provisional application No. 62/795,988, filed on Jan. 23, 2019.

(51) Int. Cl.

| | |
|---|---|
| *G06K 9/62* | (2022.01) |
| *H04B 1/3827* | (2015.01) |
| *H04W 4/029* | (2018.01) |
| *G06F 16/587* | (2019.01) |
| *G01C 21/34* | (2006.01) |
| *G06Q 10/02* | (2012.01) |
| *G06Q 10/04* | (2012.01) |
| *G06Q 50/30* | (2012.01) |
| *H04W 4/021* | (2018.01) |
| *G01S 19/48* | (2010.01) |
| *G06F 16/783* | (2019.01) |
| *G01C 21/36* | (2006.01) |
| *G06F 16/58* | (2019.01) |
| *H04W 4/18* | (2009.01) |
| *G06T 19/00* | (2011.01) |
| *G06T 19/20* | (2011.01) |
| *H04L 67/52* | (2022.01) |
| *H04N 5/232* | (2006.01) |

(52) U.S. Cl.
CPC .......... *G01C 21/3644* (2013.01); *G01S 19/48* (2013.01); *G06F 3/016* (2013.01); *G06F 16/587* (2019.01); *G06F 16/5866* (2019.01); *G06F 16/7837* (2019.01); *G06K 9/00671* (2013.01); *G06K 9/00791* (2013.01); *G06K 9/6201* (2013.01); *G06K 9/6215* (2013.01); *G06Q 10/02* (2013.01); *G06Q 10/047* (2013.01); *G06Q 50/30* (2013.01); *G06T 19/006* (2013.01); *G06T 19/20* (2013.01); *H04B 1/3827* (2013.01); *H04L 67/18* (2013.01); *H04N 5/23222* (2013.01); *H04W 4/021* (2013.01); *H04W 4/029* (2018.02); *H04W 4/185* (2013.01); *G06T 2200/24* (2013.01); *G06T 2219/024* (2013.01)

(58) Field of Classification Search
USPC ........................................................ 382/103
See application file for complete search history.

(56) References Cited

U.S. PATENT DOCUMENTS

| | | | |
|---|---|---|---|
| 10,573,020 B1 | 2/2020 | Sokolov et al. | |
| 10,834,523 B1 | 11/2020 | Rao | |
| 2010/0250113 A1 | 9/2010 | Miyata | |
| 2010/0250136 A1* | 9/2010 | Chen | H04W 64/00 701/300 |
| 2013/0090090 A1 | 4/2013 | Rivere | |
| 2014/0100995 A1 | 4/2014 | Koshy et al. | |
| 2014/0172640 A1 | 6/2014 | Argue et al. | |
| 2017/0059347 A1 | 3/2017 | Flier et al. | |
| 2017/0103571 A1 | 4/2017 | Beaurepaire | |
| 2017/0243403 A1 | 8/2017 | Daniels et al. | |
| 2017/0292313 A1 | 10/2017 | Herman et al. | |
| 2017/0343375 A1 | 11/2017 | Kamhi et al. | |
| 2017/0358147 A1 | 12/2017 | Brinig et al. | |
| 2020/0068345 A1* | 2/2020 | Ondruska | G01S 5/0284 |
| 2020/0124427 A1 | 4/2020 | Kline et al. | |
| 2020/0166366 A1* | 5/2020 | Herman | G06Q 50/30 |
| 2020/0363216 A1* | 11/2020 | Elvanoglu | G01C 21/20 |

OTHER PUBLICATIONS

United States Preinterview first office action, U.S. Appl. No. 16/712,902, dated Mar. 4, 2021, six pages.
United States First Action Interview Pre-Interview Communication, U.S. Appl. No. 16/712,883, dated Jul. 22, 2021, four pages.
United States First Action Interview Office Action, U.S. Appl. No. 16/712,883, dated Sep. 8, 2021, five pages.

* cited by examiner

LOCATING A CLIENT DEVICE USING GROUND TRUTH IMAGE RENDERING

CROSS REFERENCE TO RELATED APPLICATIONS

This application claims the benefit of U.S. Provisional Application No. 62/801,010, filed Feb. 4, 2019, U.S. Provisional Application No. 62/795,988, filed Jan. 23, 2019, U.S. Provisional Application No. 62/812,101, filed Feb. 28, 2019, U.S. Provisional Application No. 62/812,098, filed Feb. 28, 2019, U.S. Provisional Application No. 62/801,012, filed Feb. 4, 2019, U.S. Provisional Application No. 62/802,145, filed Feb. 6, 2019, U.S. Provisional Application No. 62/812,107, filed Feb. 28, 2019, which are incorporated by reference in their entirety.

TECHNICAL FIELD

The present disclosure relates to location estimation and in particular to determining a location estimate for mobile devices based on imagery captured by the mobile devices.

BACKGROUND

Many systems use global positioning system (GPS) coordinates to estimate the position of persons carrying client devices. For example, a person carrying a client device (interchangeably referred to as a "rider" herein) may wish to call a car to transport the person from his or her present location to another location, and may execute an application (e.g., a transportation service and/or ridesharing application) on his or her client device to call the car. Related art systems in this scenario match the person with a driver, and instruct the driver to drive to a location of the person, the location being determined based on GPS data (e.g., traces) of the person's client device. However, GPS data is not always accurate. For example, in areas subject to GPS interference or reception problems, such as an urban canyon with tall buildings that distort satellite signals, the GPS data of the client device may be inaccurate. This causes a practical inconvenience where a driver may be directed to an incorrect location, or a rider carrying the client device may be unable to find the driver.

Existing systems seek to solve the technical problem of improving rider location estimates by prompting users to confirm their location manually within the application. However, these related systems cause users inconvenience where users are not familiar with their exact location, and are prone to human error. The technical problem of how to derive exact rider location without the need for GPS signals where GPS signals are distorted or unavailable is not addressed by existing systems.

SUMMARY

Systems and methods are disclosed herein for determining a location of a device, such as a client device of a rider. To this end, a service (e.g., that connects a client device of a rider with a client device of a driver) receives, from a client device, a rendering of an image captured by the client device. For example, the client device executes an application for calling a driver to the location of the client device. In connection with requesting to be connected with the driver, the client device captures an image, and transmits the rendering of the image to the service. As discussed below, in some embodiments, the service is implemented within the client device The service then compares the received rendering to entries in a database of renderings, each entry including a rendering and a respective associated location. For example, the database may include renderings, such as two-dimensional or three-dimensional models, of landmarks and imagery known to exist at certain locations, where the renderings are associated with those certain locations within the entries of the databases. In some embodiments, as described below, some or all data of the image rendering database is stored at the client device.

The service determines from the comparing whether the received rendering matches a rendering included in an entry in the database of renderings. For example, the service determines if the rendering of the image captured by the client device of the vicinity of the client device matches a rendering of a landmark known to exist at a certain location. In response to determining that the received rendering matches the rendering included in the entry, the service determines the location associated with the matching rendering, and transmits the location to the client device (e.g., for display within an application that communicates with the service).

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
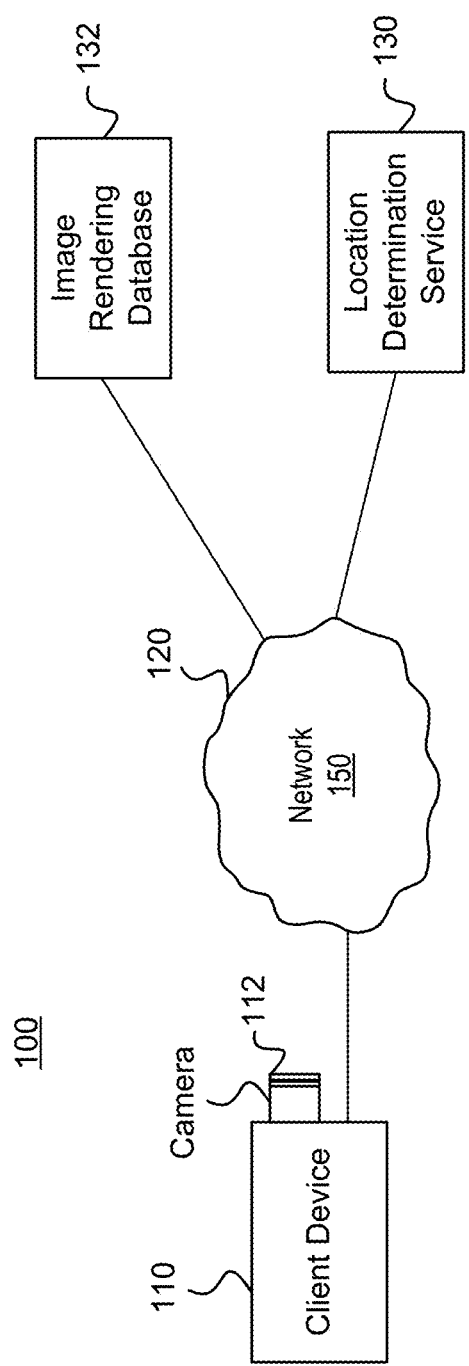
FIG. 1 is a block diagram illustrating a location estimation system according to one embodiment.

FIG. 1 is a block diagram illustrating a location estimation system according to one embodiment. System 100 includes client device 110, the functionality of which is described in further detail with respect to FIG. 5 below. Client device 110 executes an application, such as a transportation service and/or ridesharing application where a rider may request a ride from the rider's current location to a desired destination, and where the rider may be connected to a driver who also uses the ridesharing application, where the driver will provide the ride. References to driver throughout generally refer to a human driver, but equally apply to a scenario where there is no human driver, and the vehicle is an autonomous vehicle with a computing system acting as a driver. In an embodiment, client device 110 automatically captures one or more images using camera 112. For example, client device 110 captures an image upon launching a ridesharing application, upon requesting a ride, and the like. In another embodiment, client device 110 captures one or more images using camera 112 upon request by a user (e.g., in response to a user selecting an option to improve a location estimate). Automatic capturing of one or more images may be an opt-in feature, where the application by default does not automatically capture images using camera 112, and where the application has a setting that, if selected by a user of client device 110, enables the application to automatically capture the images.

In some embodiments, client device 110 transmits the image(s) to location determination service 130 over network 120, where location determination service 130 receives the image(s) and compares them to known images, stored at image rendering database 132, to determine the location of client device 110. In some embodiments, the functionality of location determination service 130 and/or image rendering database 132 is located within client device 110, and thus need not be accessed by network 120, as depicted. Image rendering database 132 may be accessed by location determination service 130 directly, or over network 120. Location determination service 130 may be a module of an application, such as a ridesharing application, or may be a component of a transportation service generally, such as a ridesharing service. In some embodiments where location determination service 130 is a module of the application, some or all of the contents of image rendering database 132 are transmitted to the client device for performing localization at the client device. The functionality of location determination service 130 will be described in further detail below with respect to FIGS. 2-4.

Identifying Regions Prone to Erroneous GPS Readings

Figure 2:
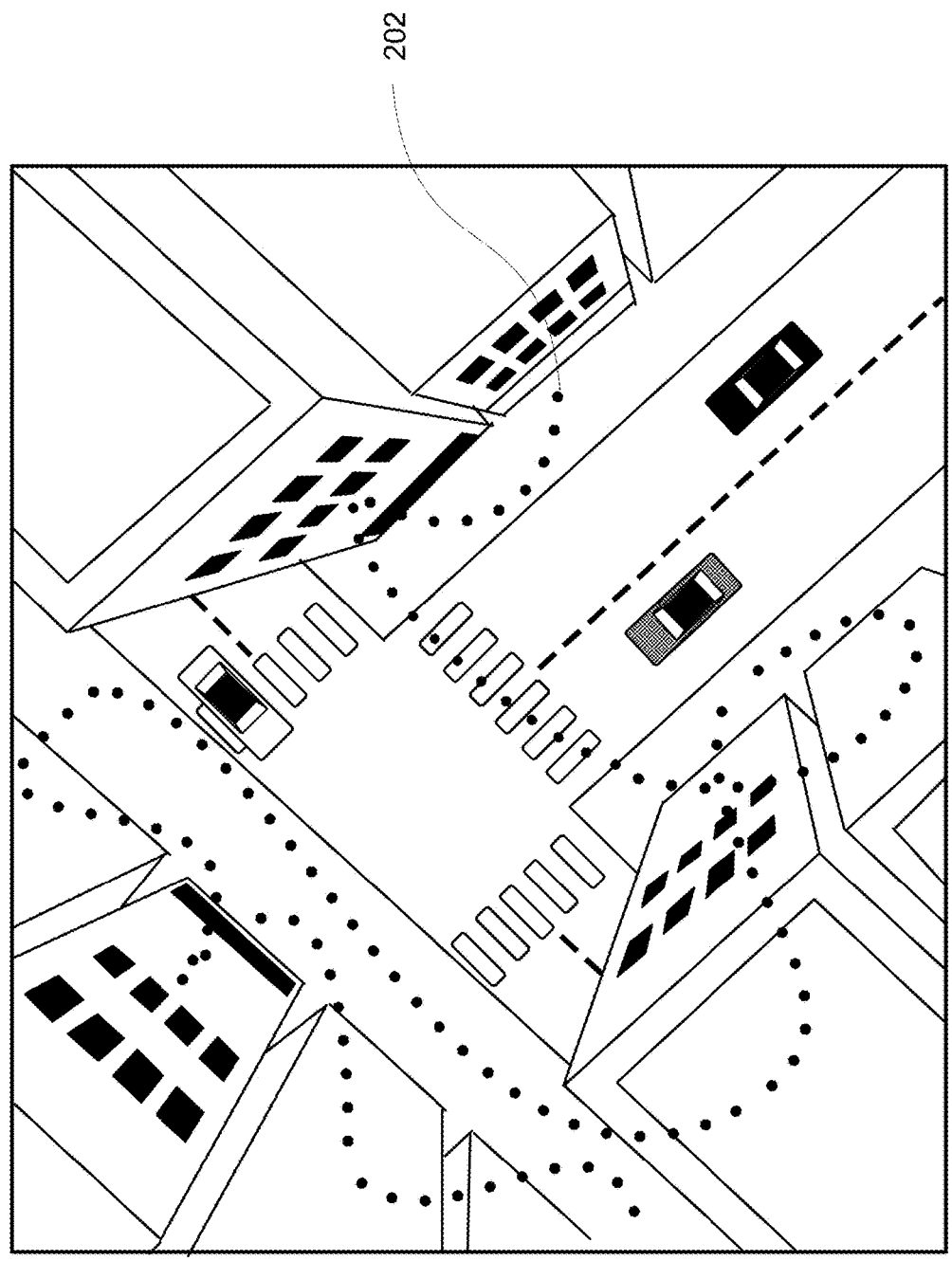
FIG. 2 is an illustration of GPS traces in a region where GPS signals are inaccurate according to one embodiment.

FIG. 2 is an illustration of GPS traces in a region where GPS signals are inaccurate according to one embodiment. Region 200 includes GPS traces 202 of various client devices as derived from the client devices. As an illustrative example, the GPS traces 202 were derived from client devices that are on, or directly adjacent, to a road. Because of the existence of tall buildings within region 200, the GPS signals used to derive the GPS traces are distorted and provide inaccurate GPS traces. This is evidenced by the GPS traces being at locations that are not on, or directly adjacent to, a road.

Region 200 is exemplary of a location known to location determination service 130 to have or cause erroneous GPS data. The identification of various regions, like region 200, which are associated with erroneous GPS data may be performed automatically by location determination server 130, or may be made based on manual feedback. For example, location determination service 130 may detect that users of a ridesharing application in a given location set a pickup pin at a location different from their GPS traces at a frequency that exceeds an implementer-defined threshold, and may determine therefrom that GPS data derived from client devices within that region are likely erroneous. As another example, location determination service 130 may detect that GPS traces of users (e.g., drivers) of a ridesharing application are, at a frequency above a threshold, in areas inaccessible to drivers, such as within buildings or parks that do not have road access, and may determine therefrom that GPS data derived from client devices within that region are likely erroneous. As yet another example, location determination service 130 may receive feedback from users that their client devices are determining erroneous locations based on GPS sensors of those client devices, and may determine therefrom that GPS data derived from client devices within that region are likely erroneous.

Exemplary Ridesharing Application User Interface

Figure 3:
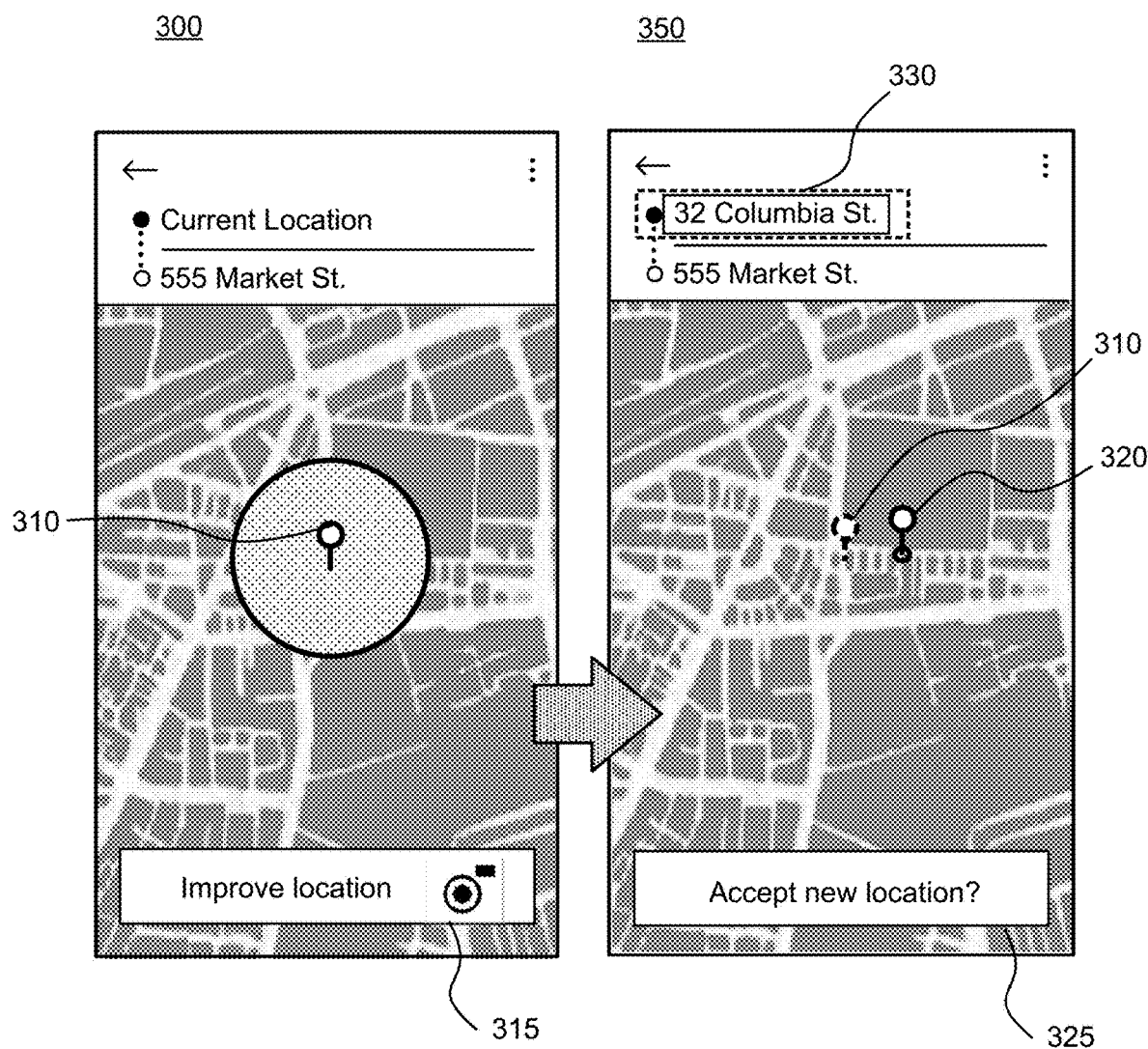
FIG. 3 is an illustration of a user interface of an application prompting a user for an image in connection with improving location estimation according to one embodiment.

FIG. 3 is an illustration of a user interface of an application prompting a user for an image in connection with improving location estimation according to one embodiment. FIG. 3 depicts a user interface of client device 110 at two different points in time—before, and after, receipt of selection of selectable option 315. User interface 300 shows the user interface prior to selection of selectable option 315. Execution by a processor of client device 110 of an application, such as a ridesharing application, causes the ridesharing application to launch, which in turn commands client device 110 to generate for display user interface 300. The commands of the application may, in whole or in part, be driven by commands received from location determination service 130. The application causes user interface 300 to display a pin denoting estimated location 310, which is derived from using GPS signals in a region known to be associated with erroneous GPS readings, such as region 200.

The application causes user interface 300 to display selectable option 315, which prompts a user to capture one or more images using camera 112 of client device 110. In some embodiments, the application commands user interface 300 to always display selectable option 315. In some embodiments, the application commands user interface 300 to display selectable option 315 in response to detecting, e.g., based on GPS traces of client device 110 derived using a GPS sensor of client device 110, that client device 110 is in a region known to be associated with erroneous GPS readings, such as region 200.

In response to detecting a selection of selectable option 315, the application causes the user interface, as depicted by user interface 350, to display a pin at a location 320 known to location determination service 130 (e.g., based on entries of image rendering database 132). Optionally, the application commands user interface 350 to also include a pin corresponding to location 310. Also optionally, the application commands user interface 350 to include an address 330 corresponding to location 320. In some embodiments, the application determines that the location of client device 110 is location 320. In other embodiments, the application generates for display selectable option 325 using user interface 350, requiring manual confirmation by a user of client device 110 that location 320 is accurate.

Location Determination Service Functionality

Figure 4:
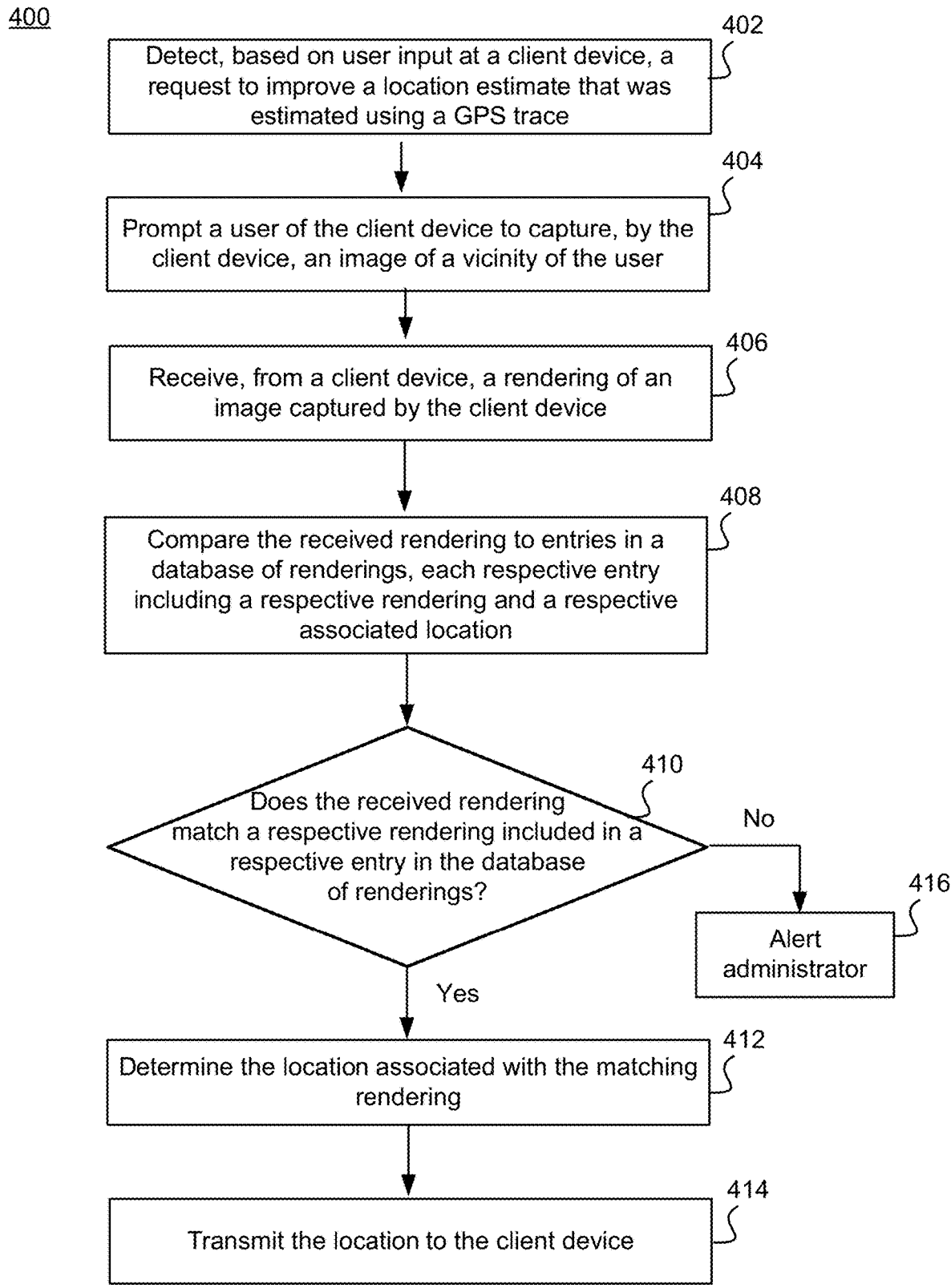
FIG. 4 is a process flow diagram illustrating a location estimation process, according to one embodiment.

FIG. 4 is a process flow diagram illustrating a location estimation process, according to one embodiment. Process 400 begins with a service, such as location determination service 130, detecting 402, based on user input at a client device, a request to improve a location estimate that was estimated using a GPS trace. For example, as described above, location determination service 130 detects a selection of selectable option 315 (which is a user interface icon for requesting an improved location estimate). Location determination service 130 application may command that selectable option 315 be displayed to the user responsive to an estimated location of the client device being within a region associated with erroneous global positioning system (GPS) data (e.g., region 200).

Location determination service 130, in response to detecting the request, prompts 404 a user of the client device to capture, by the client device, an image of a vicinity of the user (e.g., using camera 112 to capture an image of what is in front of the user). As used herein, the term vicinity may refer to objects within a line of sight of the user at the time the request is made. Location determination service 130 receives 406, from a client device (e.g., client device 110), a rendering of an image captured by the client device, as was described with reference to FIG. 1 above. The rendering may be an image itself, or a transformation of the image. In the case where the rendering is a transformation of the image, the client device may generate the rendering, or a module of location determination service 130 may generate the rendering upon receiving the image. To generate the rendering in the case where the rendering is a transformation of the image, client device 110 or location determination service 130 may generate a three-dimensional model of the captured image, and may register the three-dimensional model to three-dimensional content stored at image rendering database 132.

In some embodiments, the rendering is generated as part of a localization process (e.g., 2D-3D or 3D-3D localization). For example, client device 110 or location determination service 130 extracts 2D image features, e.g., using scale invariant feature transform ("SIFT"), object request broker ("ORB"), speed up robust features ("SURF"), or the like. In some embodiments, location determination service 130 or client device 110 builds a three-dimensional model from the captured image using a machine learned model.

Location determination service 130 then compares 408 the received rendering to entries in a database of renderings, such as image rendering database 132, each respective entry including a respective rendering and a respective associated location. For example, keypoints of the received rendering may be extracted and compared to keypoints of candidate renderings to determine whether a threshold amount of keypoints match (to be described in connection with 410 below). In some embodiments, to improve efficiency of comparing 408, the location determination service 130 compares the received rendering to the entries by extracting geolocation data from the received rendering (e.g., data corresponding to location 310). For example, even if GPS data obtained by client device 110 is erroneous, it is likely to be within a threshold distance from the actual location of client device 110. Location determination service 130 then determines a subset of the entries corresponding to the geolocation data. For example, location determination service 130 determines a radius of actual GPS coordinates that are within a threshold distance of a location indicated by the geolocation data (e.g., the radius depicted around the pin corresponding to location 310). Location determination service 130 limits the comparing of the received rendering to the subset of the entries, thus ensuring a savings of processing time and power, as only entries that are within a threshold radius of location 310 will be searched, as opposed to all entries of image rendering database 132.

Matching can be performed coarsely (e.g., as a first part of a process) by leveraging GPS to reduce the search space (e.g., to reduce the amount of database entries to be referenced, as discussed above and below). By using some large radius around a query image GPS position, the application isolates candidate renderings (e.g., images or 3D sections of the scene to match against). In some embodiments, the application performs further filtering by using the heading direction of the query image or 3D scene coordinates to align them to the base map (e.g., of a 2D or 3D model of known renderings) more readily. Additional techniques like vocab trees, bag of words or even machine learning can be used to quickly retrieve a matching set of images or 3D content.

Location determination service 130 determines 410 whether the received rendering matches a respective rendering included in a respective entry in the database of renderings. In some embodiments, in order to perform this determination, location determination service 130 determines that the received rendering does not completely match any entry of the entries. For example, when comparing two-dimensional renderings, location determination service 130 may determine that not all keypoints of the received rendering match any candidate rendering. When comparing three-dimensional renderings, location determination service 130 may determine that the keypoints of the image do not match all keypoints of any perspective of any candidate rendering.

The process of determining whether a received rendering matches a candidate rendering is also referred to as a process of "alignment" herein. Alignment refers to aligning a captured image to either stored isolated renderings that have known corresponding locations, or to a portion of a "base map" that stitches together known renderings into a model of the world, where each portion of the base map corresponds to a different location and is built from captured images of all locations that are informed by the base map. Location determination service 130 may perform 3D-3D alignment in a variety of ways. In some embodiments, location determination service 130 executes an iterative closest point (ICP) module to determine the 3D-3D alignment. Location determination service 130 may seed the 3D-3D alignment using machine-learned models that generate a segmentation by semantically segmenting the 3D scene of the base map. With that segmentation, location determination service 130 may determine a coarse alignment between similar semantic structures, such as car-to-car alignments, light post-to-light post alignments, and the like. With that coarse alignment, location determination service 130 may then revert to traditional ICP to perform the final precision alignment in an accelerated fashion.

In response to determining that the received rendering does not completely match any entry of the entries, location determination service 130 determines that a percentage of characteristics of the received rendering match characteristics of the given entry, and determines whether the percentage exceeds a threshold. In response to determining that the percentage exceeds the threshold, location determination service 130 determines that the received rendering matches the given entry based on the partial match. Likewise, in response to determining that the percentage does not exceed the threshold, location determination service 130 determines that the received rendering does not match the given entry notwithstanding the partial match.

In response to determining that the received rendering matches a rendering of an entry, location determination service 130 determines 412 that the location of the client device is the location associated with the matching rendering. For example, location determination service 130 retrieves a location indicated by the entry that includes the matching rendering, and determines that the location indicated by this entry is the location of client device 110. Location determination service 130 then transmits 414 the location to client device 110, and causes the user interface of the client device to visually indicate a location of the client device based on the transmitted location (e.g., as a replacement of the former estimate which was based on an inaccurate GPS trace). In some embodiments, in response to determining that the received rendering does not match the given entry notwithstanding the partial match, location determination service 130 transmits 416 a prompt to an administrator to add an entry corresponding to the location of the client device.

In some embodiments, location determination service 130 causes a user interface of the client device to visually indicate a location of the client device based on the transmitted location. For example, location determination service 130 may command the application running on client device 110 to display user interface 350, which includes a pin corresponding to location 320.

In some embodiments, location determination service 130 may determine that the location of client device 110 (e.g., location 320) is not an efficient point at which the user of client device 110 should be picked up for transportation (e.g., on a ridesharing service). The location determination service 130 may generate for display, in the context of the captured image taken by the client device (e.g., using user interface 300), a destination to which the user is to travel (e.g., an efficient pickup point, such as a frequently used pickup point of a ridesharing application that is located near the location of the client device). For example, the location determination service 130 may highlight a particular landmark within the captured image, such as a stop sign, or a street corner, at which the user should wait to be picked up by the driver. As another example, the location determination service 130 may include location markers, such as arrows, to which the user is to travel to get to the efficient pickup point. Location determination service 130 may in addition, or alternatively (e.g., if location determination service 130 determines that the user of client device 110 is visually impaired (e.g., based on settings of the application)), cause the user interface to designate the destination by emitting haptic feedback on the client device corresponding to a location to which the user is to travel (e.g., by vibrating left, right, up, or down, to correspond with a direction to which the user should travel).

Process 400 of FIG. 4 is merely exemplary; elements may be omitted entirely, or performed in different orders or in parallel with one another. For example, elements 402 and 404 may be omitted, and the client device may automatically capture images, rather than prompting the user with an inquiry as to whether the user wants to improve their location by manually taking photos. For example, a user may opt in to such an automatic scenario so that automatic processing is performed following such an opt-in.

Computing Hardware

Figure 5:
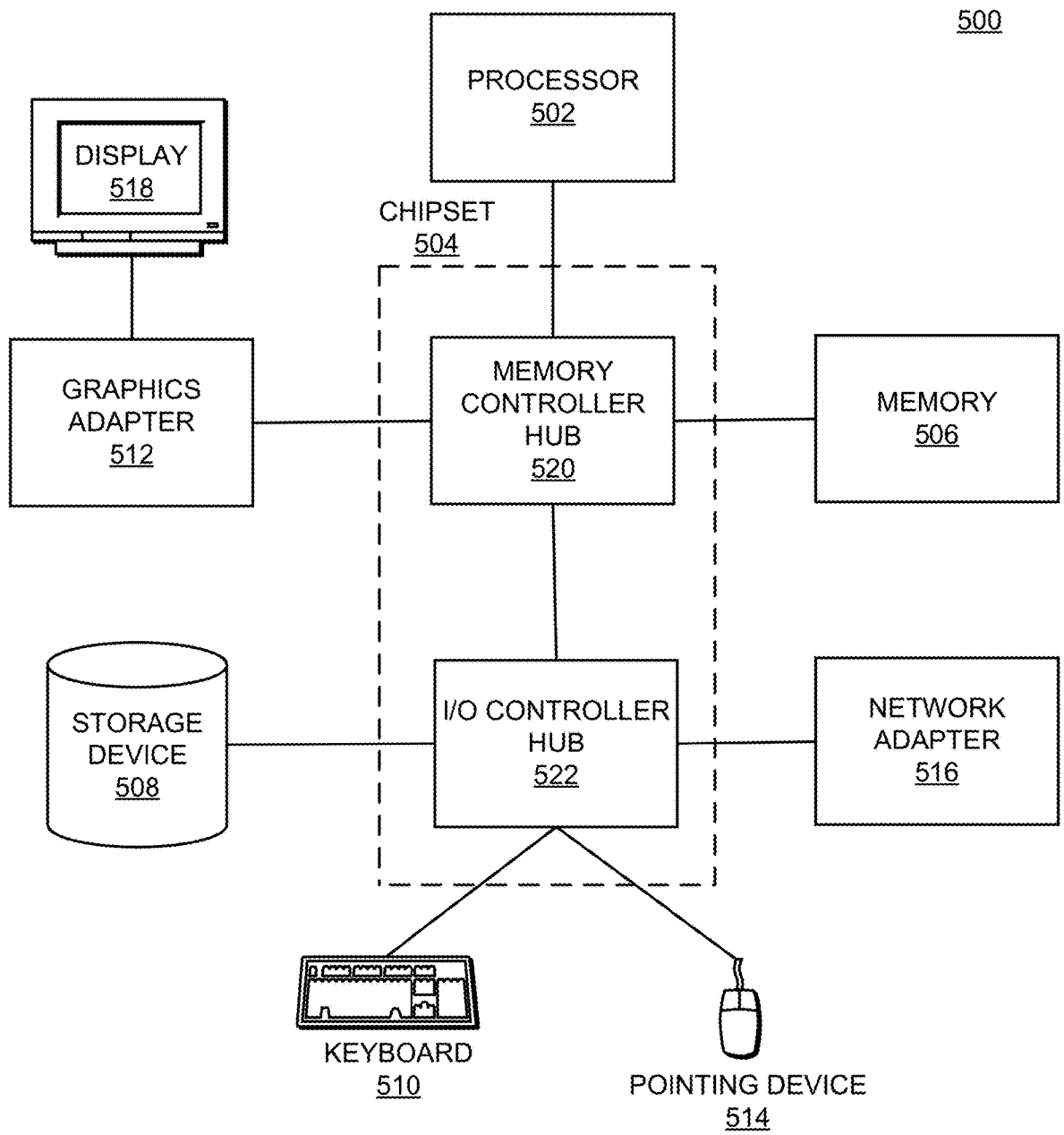
FIG. 5 is a block diagram that illustrates a computer system, according to one embodiment.

The entities shown in FIG. 1 are implemented using one or more computers. FIG. 5 is a block diagram that illustrates a computer system 500 for acting as a client 110 or location determination service 130, according to one embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 500. The graphics adapter 512 displays images and other information on the display 518. The network adapter 516 couples the computer system 500 to the network 120.

As is known in the art, a computer 500 can have different and/or other components than those shown in FIG. 5. In addition, the computer 500 can lack certain illustrated components. For example, the computer acting as the location determination service 130 can be formed of multiple blade servers linked together into one or more distributed systems and lack components such as keyboards and displays. Moreover, the storage device 508 can be local and/or remote from the computer 500 (such as embodied within a storage area network (SAN)).

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for determining a location of a device, the method comprising:
   receiving, from a client device, a global positioning system (GPS) trace used to identify a pickup location estimate in a geographic region where the client device is located;
   determining that the geographic region matches a region determined to be associated with erroneous GPS traces, the region determined to be associated with the erroneous GPS traces based on at least a number of GPS traces that are received from client devices located within vehicles and indicate that the client devices are at locations without road access;
   causing display at the client device of a user interface prompt that, when selected, initiates a process for improving the pickup location estimate;
   in response to detecting a selection of the user interface prompt, causing display of a prompt to capture, by the client device, an image of a vicinity of the client device;
   receiving, from the client device, a rendering of the image captured by the client device;
   determining, by comparing the received rendering to entries in a database of renderings, each entry including a respective rendering and a respective associated location, that
   the received rendering matches a respective rendering included in a respective entry in the database of renderings; and
   transmitting a location associated with the matching rendering to the client device, wherein a visual indication of a location of the client device based on the transmitted location is displayed on a user interface of the client device.

2. The computer-implemented method of claim 1, further comprising causing the user interface of the client device to visually indicate the location of the client device based on the transmitted location by updating the user interface to replace a visual indication of the location estimate with a visual indication of the transmitted location.

3. The computer-implemented method of claim 1, wherein comparing the received rendering to the entries comprises:
   extracting geolocation data from the rendering;

determining a subset of the entries corresponding to the geolocation data; and limiting the comparing of the received rendering to the subset of the entries.

4. The computer-implemented method of claim 1, wherein determining whether the received rendering matches the respective entry of the entries comprises:

determining that the received rendering does not completely match any entry of the entries;

in response to determining that the received rendering does not completely match any entry of the entries, determining that a percentage of characteristics of the received rendering match characteristics of the given entry;

determining whether the percentage exceeds a threshold;

in response to determining that the percentage exceeds the threshold, determining that the received rendering matches the given entry; and in response to determining that the threshold does not exceed the threshold, determining that the received rendering does not match the given entry.

5. The computer-implemented method of claim 4, further comprising, further in response to determining that the received rendering does not match the given entry, transmitting a prompt to an administrator to add an entry corresponding to the location of the client device.

6. The computer-implemented method of claim 1, further comprising:

causing the user interface to designate, in a context of the image, a destination to which the user is to travel.

7. The computer-implemented method of claim 6, wherein the user interface designates the destination by emitting haptic feedback on the client device corresponding to a location to which the user is to travel.

8. A non-transitory computer-readable storage medium storing computer program instructions executable by a processor to perform operations for estimating a location of a client device, the operations comprising:

receiving, from a client device, a global positioning system (GPS) trace used to identify a pickup location estimate in a geographic region where the client device is located;

determining that the geographic region matches a region determined to be associated with erroneous GPS traces, the region determined to be associated with the erroneous GPS traces based on at least a number of GPS traces that are received from client devices located within vehicles and indicate that the client devices are at locations without road access;

causing display at the client device of a user interface prompt that, when selected, initiates a process for improving the pickup location estimate;

in response to detecting a selection of the user interface prompt, causing display of a prompt to capture, by the client device, an image of a vicinity of the client device;

receiving, from the client device, a rendering of the image captured by the client device;

determining, by comparing the received rendering to entries in a database of renderings, each entry including a respective rendering and a respective associated location, that the received rendering matches a respective rendering included in a respective entry in the database of renderings; and transmitting a location associated with the matching rendering to the client device, wherein a visual indication of a location of the client device based on the transmitted location is displayed on a user interface of the client device.

9. The non-transitory computer-readable storage medium of claim 8, wherein the operations further comprise causing the user interface of the client device to visually indicate the location of the client device based on the transmitted location by updating the user interface to replace a visual indication of the location estimate with a visual indication of the transmitted location.

10. The non-transitory computer-readable storage medium of claim 8, wherein comparing the received rendering to the entries comprises:

extracting geolocation data from the rendering;

determining a subset of the entries corresponding to the geolocation data; and limiting the comparing of the received rendering to the subset of the entries.

11. The non-transitory computer-readable storage medium of claim 8, wherein determining whether the received rendering matches the respective entry of the entries comprises:

determining that the received rendering does not completely match any entry of the entries;

in response to determining that the received rendering does not completely match any entry of the entries, determining that a percentage of characteristics of the received rendering match characteristics of the given entry;

determining whether the percentage exceeds a threshold;

in response to determining that the percentage exceeds the threshold, determining that the received rendering matches the given entry; and in response to determining that the threshold does not exceed the threshold, determining that the received rendering does not match the given entry.

12. The non-transitory computer-readable storage medium of claim 11, the operations further comprising, further in response to determining that the received rendering does not match the given entry, transmitting a prompt to an administrator to add an entry corresponding to the location of the client device.

13. The non-transitory computer-readable storage medium of claim 8, the operations further comprising causing the user interface to designate, in a context of the image, a destination to which the user is to travel.

14. The non-transitory computer-readable storage medium of claim 13, wherein the user interface designates the destination by emitting haptic feedback on the client device corresponding to a location to which the user is to travel.

15. A system, comprising:

a processor for executing computer program instructions; and a non-transitory computer-readable storage medium storing computer program instructions executable by the processor to perform operations for estimating a location of a client device, the operations comprising:

receiving, from a client device, a global positioning system (GPS) trace used to identify a pickup location estimate in a geographic region where the client device is located;

determining that the geographic region matches a region determined to be associated with erroneous GPS traces, the region determined to be associated with the erroneous GPS traces based on at least a number of GPS traces that are received from client devices located within vehicles and indicate that the client devices are at locations without road access;

causing display at the client device of a user interface prompt that, when selected, initiates a process for improving the pickup location estimate;

in response to detecting a selection of the user interface prompt, causing display of a prompt to capture, by the client device, an image of a vicinity of the client device;

receiving, from the client device, a rendering of the image captured by the client device;

determining, by comparing the received rendering to entries in a database of renderings, each entry including a respective rendering and a respective associated location, that the received rendering matches a respective rendering included in a respective entry in the database of renderings; and transmitting a location associated with the matching rendering to the client device, wherein a visual indication of a location of the client device based on the transmitted location is displayed on a user interface of the client device.

16. The system of claim 15, wherein the operations further comprise causing the user interface of the client device to visually indicate the location of the client device based on the transmitted location by updating the user interface to replace a visual indication of the location estimate with a visual indication of the transmitted location.

17. The non-transitory computer-readable storage medium of claim 8, wherein the operations further comprise:
causing display at the user interface of the client device a visual indication of the pickup location estimate; and
receiving, from the client device, user feedback that the pickup location estimate is inaccurate, wherein the region is determined to be associated with the erroneous GPS traces further based on the user feedback.

18. The non-transitory computer-readable storage medium of claim 8, wherein the user interface prompt is a first user interface prompt, and wherein the operations further comprise causing display at the user interface of the client device a second user interface prompt that, when selected, causes the client device to transmit a confirmation that the transmitted location is accurate.

19. The computer-implemented method of claim 1, further comprising:
causing display at the user interface of the client device a visual indication of the pickup location estimate; and
receiving, from the client device, user feedback that the pickup location estimate is inaccurate, wherein the region is determined to be associated with the erroneous GPS traces further based on the user feedback.

20. The computer-implemented method of claim 1, wherein the user interface prompt is a first user interface prompt, and further comprising causing display at the user interface of the client device a second user interface prompt that, when selected, causes the client device to transmit a confirmation that the transmitted location is accurate.

* * * * *

UNITED STATES PATENT AND TRADEMARK OFFICE
CERTIFICATE OF CORRECTION

| | |
|---|---|
| PATENT NO. | : 11,308,322 B2 |
| APPLICATION NO. | : 16/712829 |
| DATED | : April 19, 2022 |
| INVENTOR(S) | : Aaron Matthew Rogan |

It is certified that error appears in the above-identified patent and that said Letters Patent is hereby corrected as shown below:

In the Claims

In Column 12, in Claim 17, Line 3, delete "device a" and insert -- device of a --, therefor.

In Column 12, in Claim 18, Line 13, delete "device a" and insert -- device of a --, therefor.

In Column 12, in Claim 19, Line 18, delete "device a" and insert -- device of a --, therefor.

In Column 12, in Claim 20, Line 27, delete "device a" and insert -- device of a --, therefor.

Signed and Sealed this
Thirtieth Day of August, 2022

*Katherine Kelly Vidal*

Katherine Kelly Vidal
*Director of the United States Patent and Trademark Office*